April 8, 1969 R. D. LELAND 3,438,037

MODULATED SUBCARRIER CONTROL CIRCUIT RESPONSIVE TO A VOLTAGE HAVING A PASS FREQUENCY AND EXCEEDING A PREDETERMINED LEVEL FOR A PREDETERMINED TIME

Filed Feb. 17, 1966 Sheet 1 of 3

INVENTOR.
ROBERT D. LELAND

BY [signature]

ATTORNEY

INVENTOR.
ROBERT D. LELAND
BY [signature]
ATTORNEY

INVENTOR.
ROBERT D. LELAND

BY Benjamin W. Coleman

ATTORNEY 3,438,037

MODULATED SUBCARRIER CONTROL CIRCUIT RESPONSIVE TO A VOLTAGE HAVING A PASS FREQUENCY AND EXCEEDING A PREDETERMINED LEVEL FOR A PREDETERMINED TIME

Robert D. Leland, Southfield, Mich., assignor to Multi-Elmac Company, Oak Park, Mich., a corporation of Michigan Filed Feb. 17, 1966, Ser. No. 528,280
Int. Cl. H04b 7/00
U.S. Cl. 343—225 7 Claims

ABSTRACT OF THE DISCLOSURE

A remote control receiver circuit operative in response to the presence of a predetermined frequency and magnitude of modulation for a minimum duration on a subcarrier having a predetermined frequency. The desired subcarrier is selected by a circuit including a rectifier circuit which is biased by a reactive circuit resonant at the subcarrier frequency. The modulation signal having the predetermined frequency is amplified by a band pass amplifier and used to control a relay circuit.

This invention relates to a frequency responsive control system, and more particularly to a remotely operated control system responsive to predetermined frequency components of a received subcarrier modulated radio frequency signal.

The present invention is an improvement of the signal-frequency-sensitive control system described and claimed in U.S. Patent 2,886,703, issued May 12, 1959, and entitled "Selective Remote Control Apparatus," which patent is assigned to the assignee of the present application. The improved feature resides in the use of a modulated subcarrier providing an additional level of signal coding. The additional signal coding reduces the probability of operation of the control relay on false signals that fortuitously carry the necessary coding. The system utilizes the principles set forth in the above mentioned patent, but modified to provide an A.C. subcarrier modulation output as opposed to a D.C. output. The new system further requires a subcarrier modulation bandpass amplifier, a subcarrier modulation detector and bidirectional time delay circuit, and an electronic control device for controlling a relay.

Heretofore, subcarrier modulation had been used exclusively in other types of specialized systems, for example, in frequency division multiplexers of the F.M./F.M. type which is commonly employed in telemetry. In such a system, one data channel is formed by the output signal of one subcarrier oscillator. The electrical signal developed by one or more sensing instruments frequency modulates the output signal of the subcarrier oscillator. The radio frequency carrier of the system is frequency modulated by the output signals of several of the subcarrier oscillators. At the receiving station, a radio frequency demodulator removes the radio frequency carrier, and the resulting output corresponds to the signal which previously modulated the carrier at the transmitter. The output of the radio frequency demodulator is applied to several subcarrier discriminators, the number of discriminators corresponding to the number of subcarrier oscillators which previously modulated the carrier at the transmitter. The radio frequency demodulator is coupled to each discriminator via an individual bandpass filter which only passes signals of the same center frequency as its respective subcarrier oscillator. Each discriminator develops an output signal representing the electrical signals that modulates the subcarrier oscillator of the same center frequency as the discriminator.

The present invention utilizes a somewhat related subcarrier discrimination technique with novel circuitry to provide a control system which is sensitive to a predetermined or preselected frequency, typically in the audio frequency range. Such a system may be used, for example, for selectively controlling the opening and closing of a garage door.

The present invention provides a control system responsive to a selectable subcarrier frequency which is present in an alternating current signal of a plurality of frequencies. The system includes an impedance network which is resonant at said predetermined subcarrier frequency and which controls the operation of the rectifying circuit. The system comprises means for producing a subcarrier modulation signal, the magnitude of which varies in response to the selected portion of the received subcarrier alternating current signal. A bandpass amplifier is connected to the rectifying circuit and has a maximum gain at or near the predetermined subcarrier modulation frequency. A subcarrier modulation detector and time delay circuit for developing the direct current voltage control signal is connected to the bandpass amplifier.

More particularly, the present invention provides a control system responsive to predetermined frequency components typically in the audio frequency range of a received subcarrier modulated radio frequency signal. The system includes an antenna for receiving the modulated radio frequency signal. A radio frequency demodulator is connected to the antenna for removing the carrier from the modulated radio frequency signal. The output of the demodulator is connected to a driver amplifier for amplifying the resultant modulated subcarrier signal. The output of the driver amplifier is capacitively coupled across an impedance network including a resistor serially connected to a parallel resonant circuit, which is resonant at the predetermined subcarrier frequency. The impedance network is connected to and operatively controls a solid-state rectifying circuit serving as a subcarrier selective detector and subcarrier demodulator stage. The output of the rectifying circuit contains the subcarrier modulation whose amplitude varies in relation to the frequency of the subcarrier and the resonant frequency of the parallel resonant circuit. The output side of the rectifying circuit is capacitively coupled to the subcarrier modulation bandpass amplifier which has a maximum gain at the predetermined subcarrier modulation frequency. The bandpass amplifier materially amplifies only those signal components having a frequency falling within the bandpass, the center frequency of which is the predetermined subcarrier modulation frequency. The output side of the bandpass amplifier is connected to a subcarrier modulation detector and bidirectional time delay circuit including first and second capacitors interconnected by a parallel combination of a diode and a resistor, wherein a direct voltage control signal is developed across the second capacitor. An electronic control device is connected across the second capacitor and operates to develop an output current in response to voltage across the second capacitor. In the output circuit of the electronic control device a relay is connected and is operatively controlled by the electronic control device. The drop-out time of the relay is determined by the rate at which the second capacitor discharges through the diode.

A principal object of the invention is to provide an improved frequency responsive control system in which a modulated subcarrier having and providing an additional level of signal coding is employed to reduce the probability of operation of the control relay on false or interfering signals that by chance carry the predetermined necessary coding, in conjunction with a subcarrier modulation bandpass amplifier, a subcarrier modulation detector and bidirectional time delay circuit, and an electronic control device for controlling a relay.

This and other objects of the present invention are set forth in the appended claims, the invention being more clearly understood from the following description when read with reference to the accompanying drawings in which:

Note should be taken that the angularly vertical broken lines of the subcarrier envelopes shown in FIGURES 2, 3, 4, 5 and 6 are not waveform representations, but rather constitute the relative area or range of the waveform as it occurs with respect to both the subcarrier frequency and time.

Figure 1:
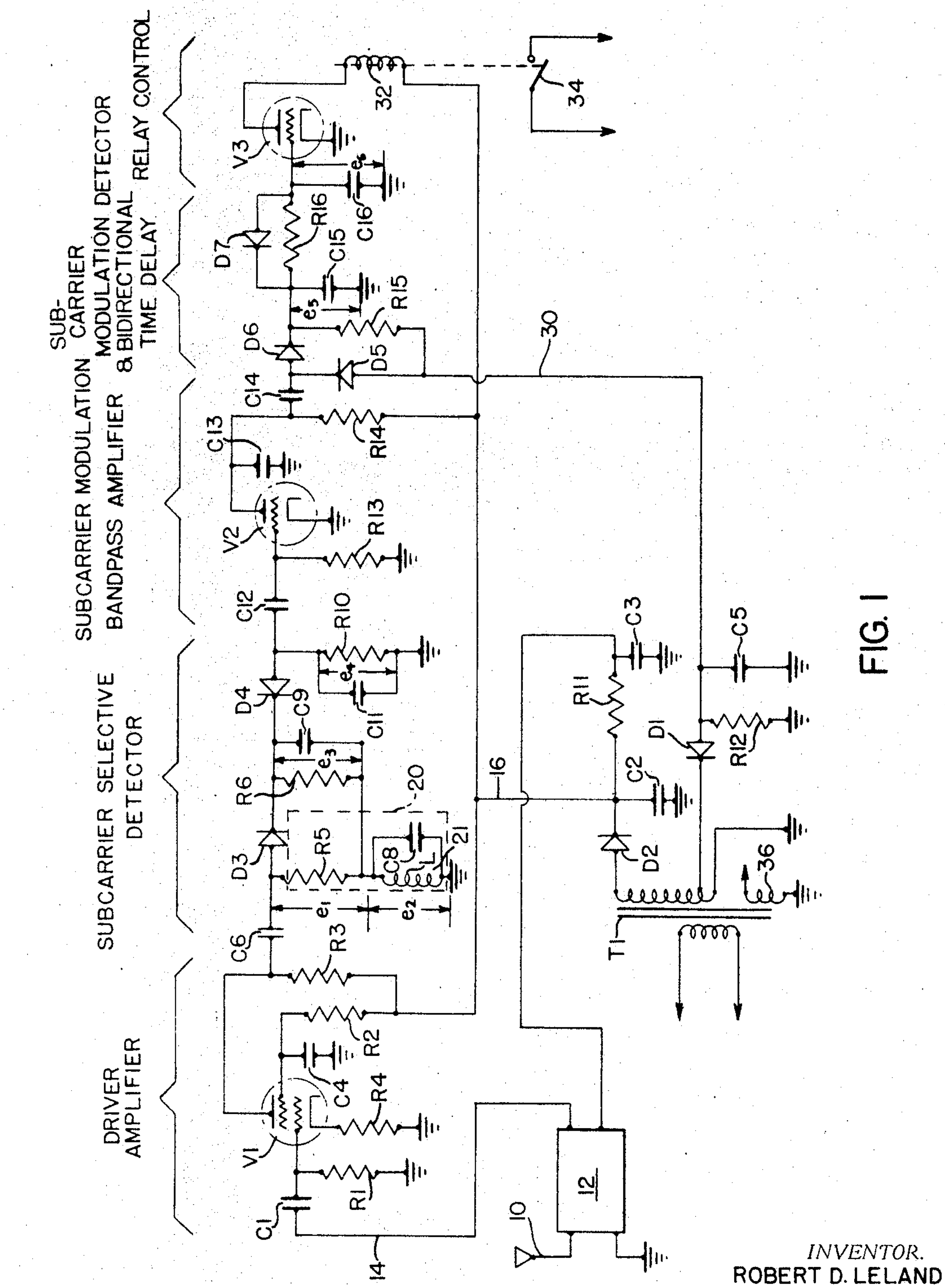
FIGURE 1 is a combination block and schematic representation of one embodiment of the present invention.

If the equipment shown in FIGURE 1 is to be controlled over a closed metallic circuit, then only the modulated subcarrier signal need be transmitted and no radio frequency demodulation is required. In such case, the antenna 10 may be omitted and the contents of rectangle 12, a radio frequency demodulator, may be totally omitted or may merely constitute an audio frequency amplifier.

The subcarrier modulation audio frequency signal appearing on conductor 14 is applied through coupling capacitor C1, and to ground through resistor R1, to apply an input voltage to the control grid of vacuum tube V1 used as a driver amplifier.

Operating voltages are applied to vacuum tube V1, and to other elements in the circuit, by means of a power supply including transformer T1, diodes D1 and D2, capacitors C2, C3 and C5, and resistors R11 and R12. The direct voltage on conductor 16 is applied through resistor R2 to the screen grid of vacuum tube V1, that grid being effectively grounded from an alternating-current standpoint by capacitor C4. The voltage on conductor 16 is also applied through load resistor R3 to the anode of tube V1. The cathode of tube V1 is grounded through biasing resistor R4.

The resultant amplified modulated subcarrier voltage appearing across load resistor R3 is applied across coupling capacitor C6 and impedance network 20. Capacitor C6 is sufficiently large so that its impedance is low for the frequencies employed. As a result, substantially the entire alternating voltage appearing across load resistor R3 appears across the impedance network 20.

Figures 2, 3, 4:
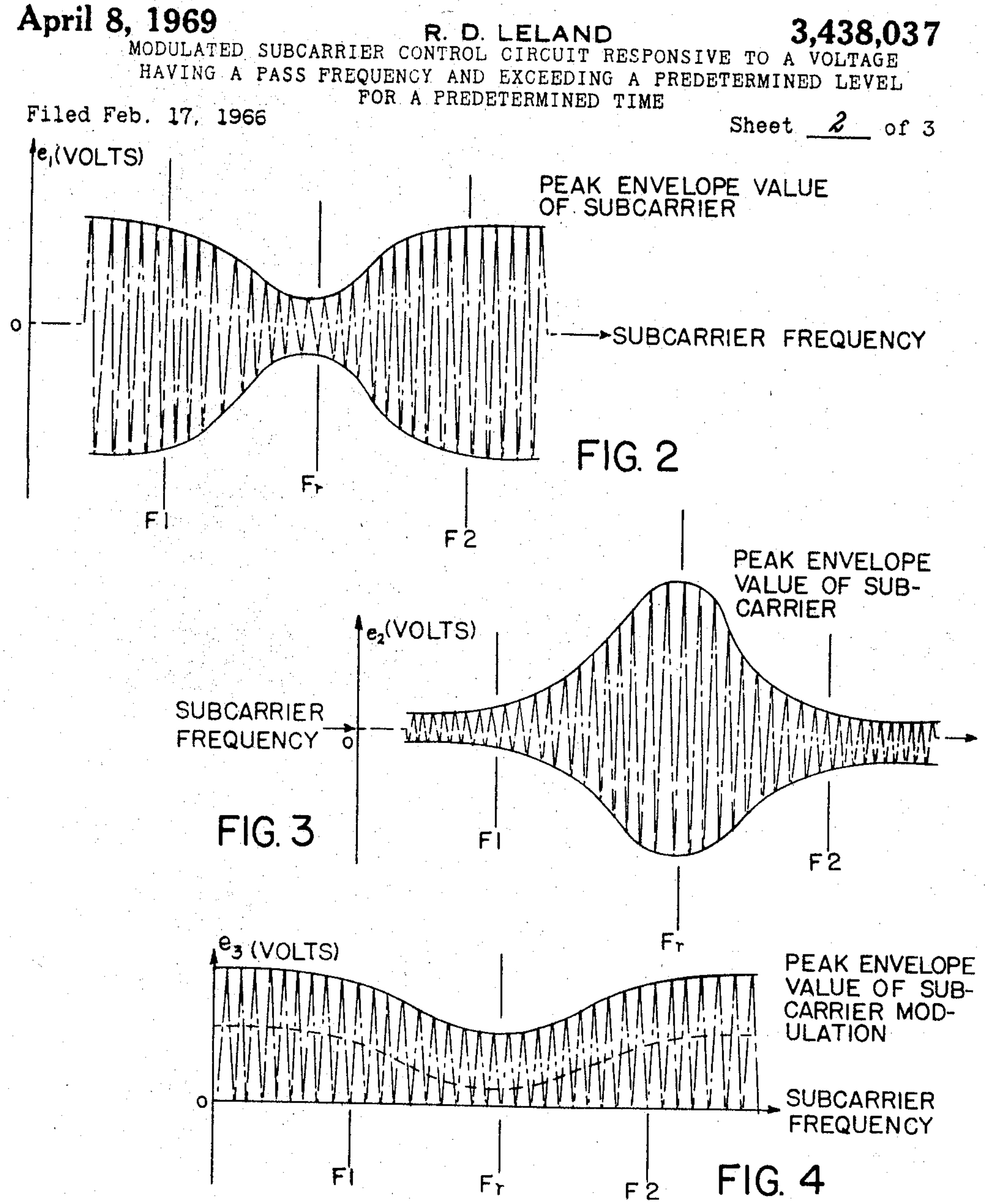
FIGURES 2, 3, 4, 5, 6 and 8 are curves representing the voltage conditions, with variations in frequency, existing at various points in the circuit of FIGURE 1.

The impedance network 20 comprises a resistor R5 connected in series with a parallel resonant circuit 21 including inductor L and capacitor C8. Tuned circuit 21 is resonant at the predetermined resonant frequency $F_r$ which, for example, may be 5,000 cycles per second. FIGURE 3 shows the curve representing the peak envelope voltage $e_2$ across resonant circuit 21 with variations in frequency of the subcarrier signal. The peak amplitude is greater at the resonant frequency $F_r$ than at a lower frequency $F_1$ or at a higher frequency $F_2$.

Impedance network 20 acts as a voltage divider. Ignoring the minor voltage drop across coupling capacitor C6, the alternating voltage across resistor R5 is effectively equal to the alternating voltage across load resistor R3 less the alternating voltage across resonant circuit 20. Thus, although resistor R5 per se is not frequency sensitive, the subcarrier alternating voltage thereacross $e_1$ will vary with frequency as shown in FIGURE 2.

It will be observed at this point that for any given subcarrier frequency the ratio of the voltage appearing across the resistor R5 to the voltage appearing across the tuned circuit 21 is constant regardless of the variations in the amplitude of the input signal. The critical bandpass of the subcarrier detector is determined when this ratio is unity, and upon a preselection of values for the resistor R5, the capacitor C8, and the inductor L, the latter two components constituting the tuned circuit 21 and the three components together constituting the impedance network 20, the width of the bandpass and the resonant frequency $F_r$ are established.

The curves represented in FIGURES 2 through 6 inclusive represent the peak envelope values of the time varying signals present at the various circuit points designated.

Impedance network 20 forms part of and controls a solid-state rectifying circuit serving as a subcarrier selective detector and subcarrier demodulator stage. Connected across resistor R5 is a diode D3 and a parallel network of load resistor R6 and filter capacitor C9. The voltage across R5 (FIGURE 2) is rectified by diode D3, and the resultant rectified voltage $e_3$ appears across load resistor R6 and filter capacitor C9 (FIGURES 1 and 4). In FIGURE 4, the dashed curved line represents the average direct current voltage as a consequence of detection of the subcarrier, and the envelope represents the subcarrier modulation.

Figure 5:
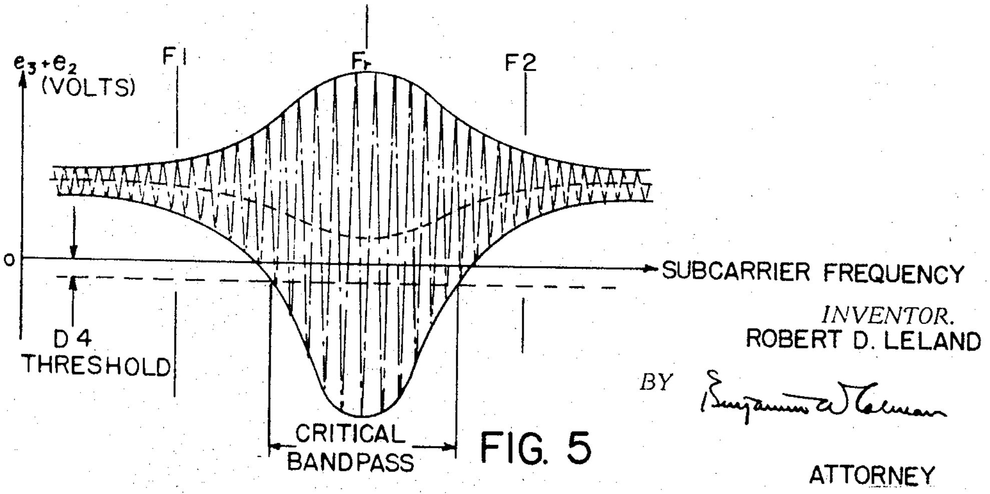

The cathode of another diode D4 is connected to the juncture of diode D3 and filter capacitor C9. The voltage at the cathode of diode D4 is equal to the sum of $e_3$ and $e_2$, and this combined voltage is shown in FIGURE 5 as a function of subcarrier frequency. The straight horizontal dashed line in FIGURE 5 represents the threshold voltage of diode D4 which will permit current to flow therethrough only when the voltage at its cathode is sufficiently negative. Consequently, only a critical bandpass (shown in FIGURE 5) of negative voltages centered about $F_r$ will be rectified by diode D4, regardless of the amplitude of the input signal.

Figure 6:
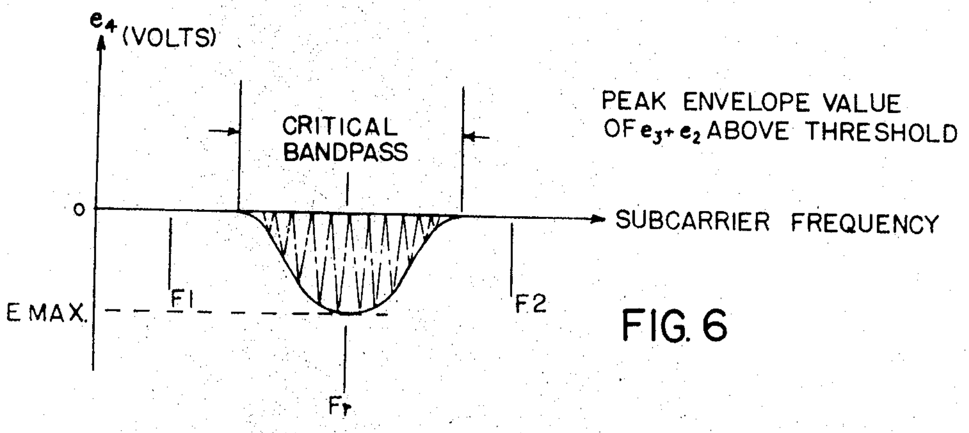

The anode of diode D4 is connected to ground by a parallel network of resistor R10 and capacitor C11. When the combined voltage $e_3+e_2$ is rectified by diode D4, the resulting voltage $e_4$ appears across resistor R10. This resulting rectified voltage $e_4$, as shown in FIGURE 6, resembles a negative square wave voltage in time, and is the subcarrier modulation. The voltage $E_{max}$, indicated in FIGURE 6, is determined by the saturation of tube V1 in the driver amplifier.

Figure 7:
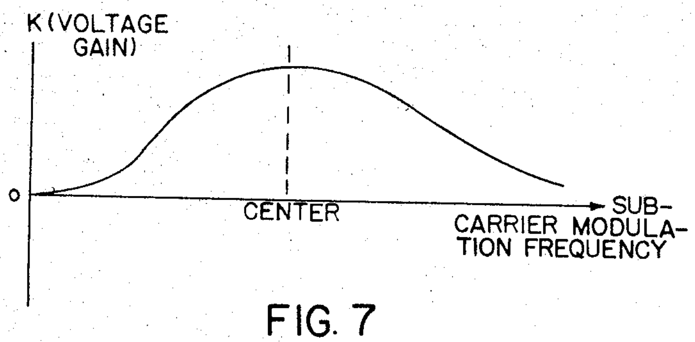
FIGURE 7 is a curve representing the voltage gain-frequency response characteristic of the subcarrier modulation bandpass amplifier shown in FIGURE 1.

The rectified voltage $e_4$ is fed into triode V2, which is part of the subcarrier modulation bandpass amplifier, through a grid circuit including capacitor C12 and grid resistor R13. The bandpass amplifier also includes a capacitor C13 connected between the triode anode and ground, a load resistor R14 connected between the triode anode and conductor 16, and a coupling capacitor C14. The frequency response characteristic of the bandpass amplifier is shown in FIGURE 7, where it is seen that the maximum voltage gain occurs at the center of the voltage gain/subcarrier modulation frequency curve. The bandpass amplifier will only amplify significantly those frequency components of the subcarrier modulation frequency falling between the minimum and maximum limits defined by the relay operating point, as shown in FIGURE 8.

Figure 8:
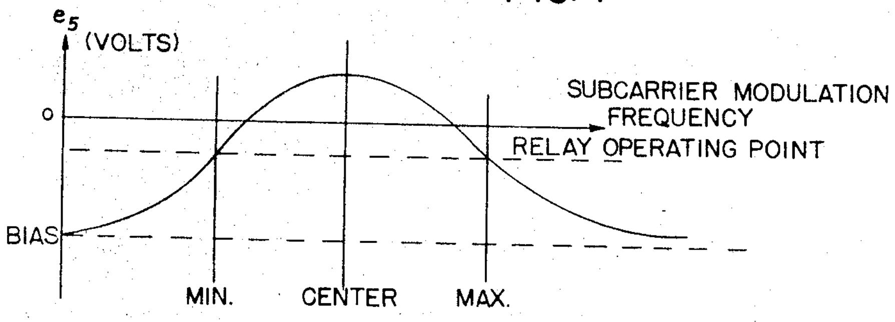

The minimum and maximum points on the voltage gain curve, FIGURE 8, are primarily established by the level of the relay operating point set in the triode V3. As this curve changes, in response to a modification of the bandpass amplifier, toward a sharper or a wider peak, the minimum and maximum limits at any predetermined level of the relay operating point (or curve) are responsively changed.

Once the saturation level in the tube V1 has been established, this function helps to set the range of the minimum and maximum points on the voltage gain curve, or the operating bandwidth, which now becomes substantially constant with signal amplitude variations met in practice.

An example only of the limits which may be used for the voltage gain curve in FIGURE 7 is to set the transformer T1 with an output of 11 volts and the triode V3 at a relay operating level of −1 volt, the resulting minimum frequency on the curve will be about 10 c.p.s., the maximum frequency about 200 c.p.s., and the center frequency about 100 c.p.s. Changes can be made at minimum, maximum and center frequencies in this curve by modification of the bandpass amplifier, as may be required or desired.

The output voltage of the bandpass amplifier is fed into a subcarrier modulation detector and bidirectional time delay circuit through coupling capacitor C14, which is connected to the cathode of diode D5 and the anode of D6. A resistor R15 connects the anode of diode D5 to the cathode of diode D6. A negative bias voltage is imposed on the anode of diode D5 by way of conductor 30 leading from the juncture of resistor R12, capacitor C5 and the anode of diode D1 in the power supply. This bias introduces a direct current reference level affecting the detection of the output voltage of the bandpass amplifier by diode D6. The cathode of diode D6 is connected to ground by capacitor C15. The biased and detected output voltage of the bandpass amplifier appears across capacitor C15 as voltage $e_5$. This voltage $e_5$ varies as a function of frequency as shown in FIGURE 8, which also shows a horizontal straight, dash line representing the operating point of a relay 32, 34 hereinafter described. In FIGURE 8, the solid curve represents the saturation level.

Figure 9:
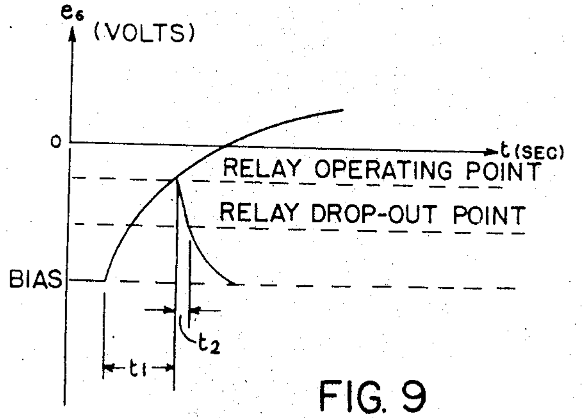
FIGURE 9 is a curve representing the direct voltage control signal $e_6$ with variation in time developed across the second capacitor C16 in the subcarrier modulation detector and bidirectional time delay circuit shown in FIGURE 1.

One end of capacitor C15 is connected to one end of a parallel arrangement of a resistor R16 and a diode D7. The other end of this parallel arrangement is connected to the grid of the triode V3 and to ground by a capacitor C16. The voltage $e_5$ on capacitor C15 causes a current to flow through resistor R16 and a voltage $e_6$ to build up on capacitor C16 as capacitor C16 charges. The direct voltage control signal $e_6$ across capacitor C16 varies as a function of time, as shown in FIGURE 9. The voltage $e_6$ controls the operation of triode V3 which together with the relay coil 32 in its output circuit constitute a relay control circuit. As capacitor C16 charges through resistor R16, the voltage $e_6$ becomes less negative or more positive until the voltage $e_6$ causes triode V3 to conduct. When triode V3 conducts, the plate current flows through relay coil 32, and consequently the relay contact 34 is closed or "pulled-in."

The elapsed time, between the point when capacitor C16 starts charging from its normally negatively-biased condition until the voltage $e_6$ reaches the point where triode V3 will conduct and relay contact 34 is pulled-in (relay operating point), is designated the relay pull-in time $t_1$, as shown in FIGURE 9.

The voltage $e_6$ is not only impressed on the grid of triode V3, but also on the anode of diode D7. As the voltage $e_6$ grows less negative or more positive, similarly the voltage at the anode of diode D7 becomes less negative or more positive until, at the relay operating point, the threshold of diode D7 is reached and diode D7 conducts. This effectively short-circuits resistor R16 and permits capacitor C16 to discharge through diode D7. As capacitor C16 discharges, the voltage $e_6$ becomes more negative which causes triode V3 to cease conducting. However, as capacitor C16 is discharging there is a time lag before the relay "drops out," i.e., relay armature moves to its normally-open position. The elapsed time between the point when capacitor C16 starts discharging until the point when the relay drops out is designated the relay drop-out time $t_2$, as shown in FIGURE 9. In the example given, the ratio of relay pull-in time $t_1$ to the relay drop-out time $t_2$ is 10, i.e., $t1/t2=10$. In effect, FIGURE 9 illustrates the time delay for the saturation level at, for example, 100 c.p.s.

The control system thus becomes responsive to all three frequency components and the relay control portion of the system cannot be operated until these three components of the input signal, present simultaneously at the antenna, pass sequentially the subcarrier selective detector, the subcarrier modulation bandpass and the subcarrier modulation detector portions of the circuit illustrated in FIGURE 1. When these three circuit networks respond to the demodulated input signal, the output signal at V3 will operate the relay control.

Referring to FIGURE 1, the small secondary winding 36 of the power supply transformer T1 may be used to supply the filament voltage required for tubes V1, V2 and V3. In the example given, the filament voltage is 6.3 volts A.C.

While tubes V1, V2 and V3 are shown as the vacuum-tube type, the present invention is equally operable using other types of electronic control devices, such as semiconductors, transistors, etc.

It is to be clearly understood that the values ascribed to the several components and features of the control system in the above description are representative only and are not to be considered limiting.

Other values for such components and features can also be used as may come within the compass of the control system of this invention.

The present invention may be used for a number of control applications. For example, the invention may be employed for controlling the opening and closing of a garage door through a door operator.

I claim:

1. A control system responsive to a received alternating current signal containing a subcarrier which is modulated at a particular frequency, comprising: means for operating on the signal to derive an alternating current of the subcarrier frequency including a rectifying circuit having an impedance network which is resonant at or near said subcarrier frequency and which controls the operation of said rectifying circuit; a bandpass amplifier connected to receive the output of said rectifying circuit and having a maximum gain at or near said modulation frequency; a detector operative to receive the alternating current output of said bandpass amplifier and to produce a direct current signal therefrom; and a time delay circuit operative to receive said direct current signal and to provide an output control signal when said direct current signal exceeds a particular magnitude for a predetermined period of time, whereby an output control signal will be produced by said time delay circuit only at such times as the received alternating current signal contains a component of said particular magnitude, comprising said subcarrier modulated at said predetermined frequency, for said period of time.

2. The control system of claim 1 wherein the received alternating current signal is derived from a radio frequency signal and the system includes a demodulator operative to receive said radio frequency signal and to provide output to said means for operating on the signal to derive an alternating current of the subcarrier frequency.

3. The control system of claim 2 wherein the radio frequency signal is derived from an antenna and a driver amplifier connects the demodulator to the means for operating on the signal to derive an alternating current of the subcarrier frequency.

4. The control system of claim 1 wherein the impedance network comprises the series combination of a resistive circuit and a reactive circuit which is resonant at or near said subcarrier frequency.

5. The control system of claim 4 wherein the voltage developed across the reactive circuit acts to bias said rectifying circuit.

6. The control system of claim 1 wherein said detector is biased so said direct current signal is only produced at such times as the alternating current output of the bandpass filter exceeds said particular magnitude.

7. A receiver responsive to a radio frequency signal containing a subcarrier which is modulated at particular frequency, comprising: an antenna for receiving said radio frequency signal; a demodulator connected to the antenna and operative to demodulate the radio frequency signal; means for operating on the demodulated radio frequency signal to derive an alternating current of the subcarrier frequency, said means including a series combination of the resistive network and a reactive network which is resonant at or near said subcarrier frequency and a rectifier which is biased by the voltage across said reactive network; an amplifier tuned to pass the particular modulating frequency connected to the output of the means for operating on the alternating current signal; a detector operative to receive the output of said amplifier and to produce a direct current signal therefrom; and means for receiving the output of the detector and for generating an output control signal when the output of the detector exceeds the predetermined magnitude for a predetermined period of time.

References Cited

UNITED STATES PATENTS

| | | | |
|---|---|---|---|
| 3,187,234 | 6/1965 | Muranica. | |
| 3,366,961 | 1/1968 | Goldstein. | |
| 2,428,297 | 9/1947 | Seeley | 325—37 |
| 2,695,977 | 11/1954 | Hupert et al. | |
| 2,788,521 | 4/1957 | Undy | 343—225 |
| 2,886,703 | 5/1959 | Undy | 317—147 X |
| 3,056,928 | 10/1962 | Marks | 317—147 X |
| 3,133,252 | 5/1964 | Skolnick | 317—147 X |
| 3,303,396 | 2/1967 | Culbertson | 317—142 |

JOHN W. CALDWELL, *Primary Examiner.*

A. J. KASPER, *Assistant Examiner.*

U.S. Cl. X.R.

317—147; 325—37, 392; 328—137; 340—171